July 31, 1934.      B. C. PLACE      1,968,168
SECURING TRIM PANELS OR THE LIKE
Filed Jan. 21, 1932      2 Sheets-Sheet 2

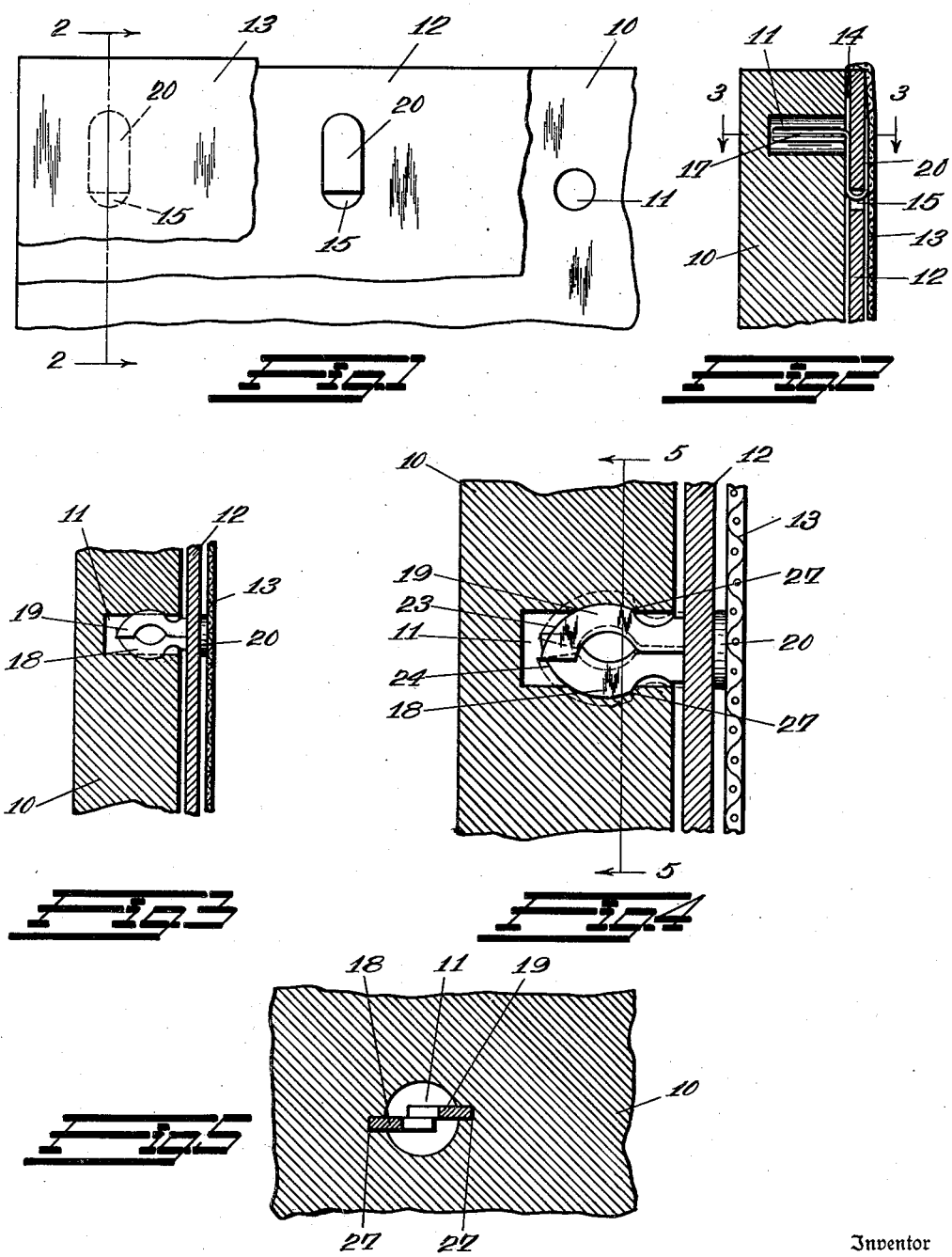

Inventor
Bion C. Place
By
Strauch & Hoffman
Attorneys

Patented July 31, 1934

1,968,168

UNITED STATES PATENT OFFICE 1,968,168

SECURING TRIM PANELS OR THE LIKE

Bion C. Place, Detroit, Mich., assignor of one-half to George E. Gagnier, Detroit, Mich.

Application January 21, 1932, Serial No. 588,029

6 Claims. (Cl. 45—138)

This invention relates to a method and arrangement for securing trim panels or the like to a supporting structure by means of spring or snap fasteners. More particularly, the invention relates to a method of and arrangement for securing automobile panels to wooden or composite bodies by means of fasteners that may be used with equal facility in securing such panels to metallic bodies, whereby identical fastening elements may be used in automobile body constructions of a composite nature, that is, bodies that are constructed partly of wood and partly of metal.

In attaching trim panels to composite automobile bodies, it is generally the practice to utilize driven fasteners, such as nails or tacks to hold the panels in position on the frame of the body. Securing trim panels to wooden bodies by nails or tacks would present no difficulty, if the nails or tacks could be permitted to pass completely through the panel. This is impractical in upholstery or similar installations, because the heads of the fasteners would thus be visible, and it is essential in order to provide a neat appearing finished job that the heads be concealed. To this end, it is the general practice to drive the nails or tacks through the fibrous or similar foundation or body of the panel, prior to the application of the covering material to the face thereof that would otherwise be exposed, and to then apply a fabric cover of approved material, that covers the heads of the fasteners driven through the foundation or body. In order that the fasteners may be assembled with respect to the panel, in the manner just stated, it is essential that the operation of covering the panel take place after the tacks or nails have been driven through the foundation or body. The covering of the panel of a foundation or body through which a multiplicity of tacks or nails have been driven offers difficulties because of the protrusion of the pointed ends or shanks of the fasteners. This mode of procedure is further objectionable in that when completed panels are stacked with the nails or tacks protruding from the rear face thereof, said nails or tacks have a tendency to puncture the fabric of any other panel with which they may be brought in contact, and, furthermore, frequently become bent, making it difficult to subsequently properly install the panel by nailing or tacking it to the wooden supporting structure. Again even if the points or the shanks of the nails or tacks are unbent, the application of a panel, constructed in this manner, is a laborious operation because of the necessity of exercising care in tacking or nailing the panel in position, inasmuch as the operator, being unable to see the heads of the nails or tacks, must be careful that he does not drive the fasteners in such manner as to cause their shanks to be bent rather than driven straight into the wood.

Another method of securing trim panels to wooden automobile bodies that did not require that the panels be covered after the fasteners were first assembled with respect to the foundation thereof, and which has been used, involved the use of brads, or fasteners having heads that were only slightly larger than the shanks thereof. The brads were driven through the completed panel including the covering penetrating the latter. The small heads were concealed by pulling the fabric thereover after the brads had been driven into the supporting structure. This arrangement is not entirely satisfactory because the fabric was perforated by drawing it over the brads, and because the holding power of the small headed fasteners was frequently insufficient so that panels could readily be separated from the brads driven into the supporting structure.

This invention aims to provide a method of and arrangement for securing trim panels to wooden or composite bodies so that the panels can be covered prior to the application of the fasteners thereto, and so that the fasteners can subsequently be applied to the supporting structures of the bodies with a minimum of effort and without perforation of the panel covering.

This invention also aims to secure trim panels to a wooden supporting structure by means of spring fasteners that are driven into holes specially formed in the wooden supporting structure, which holes have dimensions so related to the spring fasteners that when the fasteners are driven in place the shanks thereof are expanded causing portions to bite into or frictionally firmly grip the wall or walls of the holes formed in the wooden supporting structure.

A further object of the invention is to provide a novel method of securing trim panels to wooden supporting structures by forming holes in the supporting structures, and bringing about an interlock between the resilient shanks of snap fasteners and the wall or walls of the holes in wooden supporting structures, whereby the panels are firmly held in position with facility of removal and replacement.

A further object of the invention is to provide an arrangement for securing trim panels to wooden supporting structures by means of snap fasteners each of which includes a plurality of resilient arms arranged so that when in position the arms apply a firm pressure in a direction normal to the length of the shank of the fastener which pressure is made effective against a wall or walls of preformed openings in the wooden supporting structure to hold the panel in position.

A further object of the invention is to provide a novel arrangement for securing automobile or similar trim panels to vehicle bodies including a wooden supporting structure, in which the panels are attached by means of spring fasteners each of which includes a plurality of arms having side surfaces thereof that are formed convexly so as to enable the shank of the fastener to be readily entered in a hole formed in the wooden supporting structure to receive it and to cause said arms to bite into or frictionally grip said structure after the fastener has been driven into operative position.

A further object of the invention is to provide a novel arrangement for securing automobile or similar trim panels to wooden supporting structures by means of fasteners formed so that they may be interlocked with respect to the panel after the panel has been completely covered and is ready for application to the supporting structure, and which at the same time include resilient shanks having a number of arms each of which is formed so as to have a tendency to bite into the wood when the fastener is driven into openings provided therein to receive it.

Further objects of the invention will appear as a description thereof proceeds with reference to the accompanying drawings in which:

Figure 1 is a fragmentary elevational view showing one arrangement for applying or securing automobile trim panels to a wooden supporting structure.

Figure 2 is a sectional view taken on the plane indicated by the line 2—2 in Figure 1.

Figure 3 is a sectional view taken on the plane indicated by the line 3—3 in Figure 2, looking in the direction of the arrows.

Figure 4 is a view similar to Figure 3, but showing the arrangement on an enlarged scale and illustrating the contraction of the shank of the fastener in entering the hole in the wooden supporting structure.

Figure 5 is a view taken on the plane indicated by the line 5—5 in Figure 4, looking in the direction of the arrow.

Like reference characters indicate like parts throughout the several figures.

Figure 6:
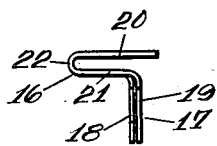
Figures 6 and 7 are respectively side and end views of a sheet metallic fastener that may be used to secure the trim panels of the wooden supporting structure.

The present invention is intended for use in connection with the attachment of automobile or similar trim panels to the interior of composite or wooden automobile or similar bodies, that is, bodies in which the frame thereof is either made of wood, or part wood and part metal.

In order to avoid the above enumerated difficulties incident to the covering of panels containing fasteners having protruding shanks, and to avoid the perforation of the panel covering, this invention provides a novel method and arrangement whereby spring fasteners may be substituted for the pointed or driven fasteners and whereby the spring fasteners may be assembled with respect to the panel after the panel has been completely manufactured by the assembling of the upholstery material and the foundation or body.

In the preferred embodiment of the invention illustrated in the drawings the numeral 10 designates a wooden supporting structure forming any part of a frame of an automobile or similar body. In order that spring or snap fasteners may be used to secure trim panels to such supporting structure, it is preferably provided with a multiplicity of holes 11 bored at properly spaced intervals in the supporting structure. Said holes are preferably circular in cross section, but holes of any desired configuration may be formed, the circular hole being preferred because of the convenience with which such holes may be formed in the wooden structure by means of boring tools.

The panel that is to be attached to the wooden or composite supporting structure includes, as is customary, a foundation or body 12 of fibrous or other similar stiff material and an upholstery covering 13 of mohair, velvet, plush or any suitable fabric, the edges of the fabric covering being lapped around the edges of the foundation or body 12 as indicated at 14. The fabric is secured to the foundation or body at its edges as by sewing, pasting or the like and wadding may be used between the foundation and fabric.

Prior to the application of the covering 13 to the foundation or body 12 said foundation or body is cut to the outline of the surface that is intended to be covered by the completed panel, and, preferably, in the same operation suitable openings 15 are formed in said foundation or body, said openings 15, being arranged at approximately equally spaced intervals relatively close to the margin of the body. The openings 15 may be in circular, square, or any desired outline, and are of sufficient size to permit the passage of a portion of a spring fastener having a head in the form of a hook to be freely passed therethrough so that one arm of the hook may be disposed between the fabric cover 13 and the adjacent face of the foundation or body 12 in the manner hereinafter described.

Figure 7:
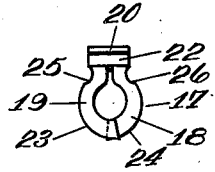
Figure 8:
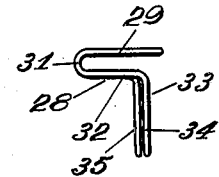
Figures 8, 9 and 10 are respectively, side, end and top views of a fastener constructed of wire rather than sheet metal.

Spring fasteners of various kinds may be utilized to secure trim panels constructed as just described to wooden supporting structures having holes of proper diameter or width formed therein. One fastener which has been found satisfactory for this purpose is illustrated in Figures 6, 7 and 8 of the drawings, and comprises a head 16 in the form of a hook, and a shank 17 including a pair of legs 18 and 19 projecting approximately at right angles to the arms of the head 16. The fastener of these figures is preferably punched from sheet metal in proper outline and subsequently bent into the form illustrated in the drawings. The hook head 16 consists of a pair of arms 20 and 21 spaced apart approximately the intended thickness of the foundation or body to which the fastener is to be applied, the arms 20 and 21 being connected together by an integral portion 22. Preferably the arm 21 is split longitudinally to provide independent portions one of which carries the leg 18 and the other of which carries the leg 19. The legs 18 and 19 are provided with convexly formed outer surfaces, or said outer surfaces may be formed in any other way so as to provide spaced surfaces that meet an angle at the point of maximum width of the shank 17 of the fastener, so as to provide guiding surfaces 23 and 24 beyond the point of maximum width of the shank of the fastener and holding surfaces 25 and 26 between said points and the head 16 of a fastener. The arms 18 and 19 are arranged so that they are relatively free to be brought toward each other without substantial interference so that the overall width of the shank 17 of the fastener may be reduced when it is driven in a hole in the supporting structure in the manner hereinafter stated. To this end one of the legs 18 and 19 may be bent out of the plane of the other, or the portion of the arm 21 of the hook that carries the leg 18 may be made shorter than that which carries the leg 19 so that the leg 18 is normally disposed in a plane inside of that of the leg 19.

In the use of the fastener just described in securing trim panels to wooden bodies the panel is first constructed by stamping out of fibrous material the foundation or body 10 in the outline of the surface to be covered by the completed panel. Preferably, at the same time the body 10 is punched out, the openings 11 in suitable form are formed therein, permitting the subsequent passage of the head of the fastener through the body from the rear face thereof. The body 10 is then covered with suitable upholstery material 13 covering the openings 11 at one side of the body, the edges of the upholstery fabric being turned around the edges of the body 10 and sewed, glued or otherwise suitably attached to the rear face of the body. As illustrated, the turned back edges terminate substantially short of the openings 11 in the body so that said openings are exposed for insertion of the fasteners. The panels are completely constructed in the manner just described, and may be shipped to the point at which they are to be applied to the interior of the automobile bodies. At such points, preferably, the fasteners are assembled with respect to the panels prior to the application of the panel to the supporting structure. This is accomplished by hooking a multiplicity of fasteners onto the body of the panel by causing the arm 20 of each of said fasteners to pass through an opening 11 in the body thereof and moving said arm into position between the covering material 13 and the covered side of the body as illustrated. In applied position the fastener heads grip the foundation between the arms 20 and 21 and are held immovable or interlocked thereto, remaining properly in position during the application of the panel. After a panel has been provided with a multiplicity of fasteners assembled with respect thereto after the covering material has been applied to the body, it is ready for application to the supporting structure, which is provided with the holes 11 located so that they are opposite the fasteners that have been assembled with respect to the panel. The panel is then secured in position by bringing the shanks 17 of the fasteners opposite the holes 11 in the supporting structure, and utilizing a mallet or the like for driving the shanks 17 into said holes. Since the diameter or width of the preformed holes in the supporting structure is made substantially less than the normal maximum width of the shank of the fastener, the converging guiding portions 23 and 24 first engage the wall or walls of the holes so that upon continuation of the application of the driving force the two legs 18 and 19 of the shank of the fastener are caused to be drawn towards each other in opposition to the inherent resilience of the fastener placing the independent portions of the arm 21 of the head of the fastener under torsion. Inasmuch as the fastener is tempered so that it presents relatively great resistance to the compression of the shank of the fastener in the manner just stated, it will be understood that such resistance is effective to cause the legs 18 and 19 to bite into the holes of the wooden supporting structure. As the shank of the fastener is driven completely into the holes so that the panel lies flush or substantially flush against the supporting structure the shank of the fastener is contracted so that it assumes the form approximately shown in Figures 4 and 5, the dotted lines in said figures indicating the position or the approximate position of the legs of the shank of the fastener prior to the contraction of said shank in entering the hole in the supporting structure. In operative position the legs 18 and 19 bite into the wood substantially as illustrated at 27, though it will be understood that if the supporting structure is constructed of material that is very hard said legs may enter and bite into the wood only slightly, or may merely frictionally grip the walls of the hole serving to hold the panel in position in the supporting structure with sufficient force to prevent its withdrawal except upon the application of tools intended to effect separation of the panel from the supporting structure.

Figure 9:
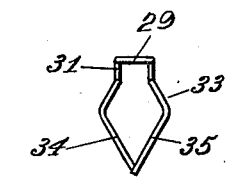
Figure 10:
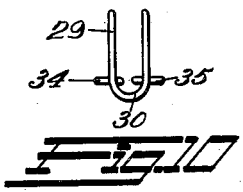

While it is preferred to construct fasteners such as above described from sheet metal so that the sides of the legs 18 and 19 are relatively narrow and sharp, presenting a substantial tendency to bite into the wood, the fasteners may be constructed of other material as, for example, of relatively stiff wire bent into a suitable form and subsequently tempered to the desired degree. Such a fastener is illustrated in Figures 8, 9 and 10, which show a one-piece construction formed from a single length of wire. In this embodiment of the invention the head 28 is of the form as previously described, which head is formed from the mid-portion of the wire. The upper arm 29 of the head is formed by providing a U-bend 30 in the mid-portion of the wire. The portions of the wire adjacent the part thereof that forms the arm 29 is bent downward to provide the connecting portion 31 to space the arm 29 of the head 28 from a further arm 32 formed by bending the portions of the wire inwardly into approximate parallelism with the arm 29. The ends of the wire are then bent into planes approximately normal to the arms 29 and 32 to form a shank 33 consisting of two legs 34 and 35 that are bowed outwardly between the arms 32 and the tips of the wire as illustrated to provide guiding and holding surfaces corresponding to the guiding and holding surfaces 23, 24, and 25, 26 respectively of the fastener before described.

The fastener of Figures 8, 9 and 10 is used as above described with reference to the fastener illustrated in detail in Figures 6 and 7. The rounded legs 34 and 35 of the shank 32 of the fastener bite into the wood or grip it frictionally with sufficient force to enable the panel to be firmly held in position by the use of the fastener just described.

The sheet metal or wire fastener just described is provided with a hook-shaped head intended to be interlocked with respect to the panel after the covering material has been applied to the front face thereof by hooking the fasteners on the material in such a way that the hook-shaped heads grip a portion of the foundation or body of the panel.

The present invention is also applicable to arrangements in which the fastener is interlocked with the panels in other ways, that is, fasteners having a hook-shaped head are not essential, though the preferred embodiment includes such a head. For instance, the fastener illustrated in Figures 12, 13 and 14 may be used. In these figures a fastener constructed of a single piece of relatively stiff wire, the mid-portion of which is bent in the form of a loop 36 constituting the head of the fastener, which is flat in this instance. The portions of wire adjacent the ends of the loop are turned inwardly in the plane of the loop providing arms 37 and 38 that carry respectively the legs 39 and 40 of the shank 41 of the fastener. The legs 39 are bowed outwardly between the head 36 and the tip of the wire as illustrated to provide guiding and holding surfaces corresponding respectively to the surfaces 23, 24 and 25, 26 of the fastener first described.

Figure 11:
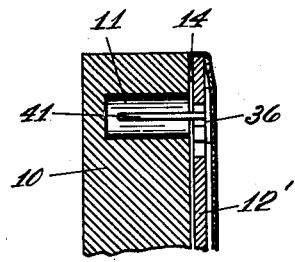
Figure 11 is a modified arrangement for securing trim panels to a wooden supporting structure.
Figure 11A:
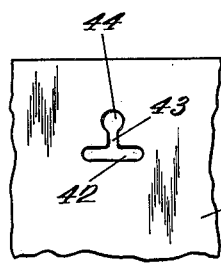
Figure 11a is a fragmentary view of an edge of the foundation in which is a specially formed opening enabling the fastener illustrated in Figure 11 to be assembled with respect to the foundation or body after the covering material has been applied thereto.

In the use of this fastener the body 12' of the panel is preferably provided with a specially formed opening illustrated in Figure 11a, said opening constituting an enlarged portion 42, a narrow portion 43 opening into a circular portion 44, permitting the fastener to be applied from the uncovered face of the foundation or body in the manner fully pointed out in my Patent #1,722,944. The fasteners are assembled with respect to the body and the panel is then applied to the supporting structure by forcing the shank 41 in holes 11 formed at proper positions in the wooden supporting structure or the like, the legs 39 and 40 frictionally gripping the wall or walls of the holes 11 in the manner above described.

Figure 12:
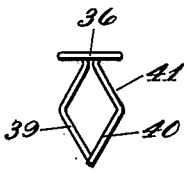
Figures 12, 13 and 14 are respectively side, end and top views of a preferred form of wire fastener that may be used as illustrated in Figure 11.
Figure 13:
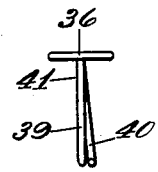
Figure 14:
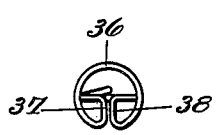
Figure 15:
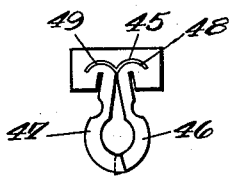
Figure 15 is a blank from which a sheet metal fastener to be used as in Figure 11 may be formed.
Figure 16:
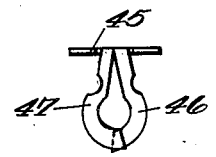
Figure 16 is a side view of a fastener formed from the blank of Figure 15.

A flat headed fastener of the kind illustrated in Figures 12, 13 and 14, may be formed of sheet metal by punching from a sheet of metal a blank in a form such as illustrated in Figure 15 of the drawings. As illustrated in this figure, the blank punched from the sheet of metal consists of a portion 45 which may be in any suitable outline, since this portion constitutes, in the completed fastener, the flat head thereof. Projecting away from the portion 45 are further portions 46 and 47 which are stamped from the blank in such a way that these portions may be bent at right angles to the plane of the portion 45 to form legs 46 and 47, shaped so as to provide convex surfaces intended to engage the walls of the hole formed in the supporting structure. Preferably, the slits which separate the portions 46 and 47 from the head 45 extend within the portion 45 a sufficient extent so that the legs 46 project away from the head at the approximate geometrical center of said head though other arrangements may be utilized if desired. Curved slits 48 and 49 may be formed in the head 45 as shown in Figure 15 to separate the portions of the head that carry the legs 46 and 47 in part from the remainder so as to increase the flexibility of the fastener at the points of connection between said head and legs.

The sheet metal fastener just described may be interlocked with respect to the foundation or body of the covering material after it has been applied to one face thereof through such specially formed openings as illustrated in Figure 11a in the drawings and the assembly of the panels with respect to the supporting structure is subsequently brought about in the manner illustrated in Figure 11 as above described with reference to the fastener illustrated in Figures 12, 13 and 14.

It will be observed that all of the fasteners above described are not only adapted to hold panels to wooden supporting structures, but they are likewise capable of successfully holding panels to a supporting structure in which metallic plates constitute the elements thereof to which the panels are to be secured. It will be apparent therefore that the fasteners of the present invention are not only adapted to secure the trim panels to wooden supporting structures, though they are designed to successfully do so, but at the same time the identical fasteners can be used to secure trim panels to metallic supporting structures. It is thus apparent that fasteners are provided that will serve the double purpose of securing trim panels to either metallic or wooden supporting structures though the present invention resides particularly in the use of such fasteners to secure panels to supporting structures provided with holes formed in the wooden structure of such dimension that, when fasteners are driven therein, the two legs forming the shank thereof will bite into or frictionally grip said walls and firmly retain the covering material in position. It frequently happens that in the construction of automobile bodies at some points in the body the panels are secured to a wooden supporting structure and at other points to a metal supporting structure. By proceeding as described in this application, identical fasteners can be used throughout the body irrespective of whether the foundation is of wood or of metal.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:—

1. In combination, a wooden supporting structure provided with a hole, a panel lapping said structure, and a spring fastener interlocked with said panel and including a shank having a single pair of sheet metallic arms disposed so as to present the edges of the sheet metal from which the arms are formed to the walls of said hole, said arms exerting a pressure applied in a direction substantially normal to the length thereof to cause said edges to bite into said wooden structure.

2. The combination defined in claim 1 in which said arms are shaped to present convex exterior surfaces and relatively sharp shoulders to said walls.

3. In combination, a wooden supporting structure provided with a hole, a panel lapping said structure and consisting of a stiff foundation and a fabric covering for one side of the foundation, a spring fastener engaged with said body from the uncovered side thereof and including a shank having a normal width exceeding a cross dimension of said hole and consisting of only a pair of spring arms, the edges of which are relatively narrow, said edges being embedded in the wall or walls of said hole.

4. In combination, a wooden supporting structure provided with a hole, a panel lapping said structure and consisting of a stiff foundation and a fabric covering for one side of the foundation, a spring fastener having a head hooked into engagement with said foundation from the uncovered side thereof and a shank projecting away from said foundation and having a normal width exceeding a cross dimension of said hole and consisting only of a pair of spring arms the outer surfaces of which diverge adjacent said head and converge adjacent the end of the shank, said arms having a relatively narrow width and biting into the wall or walls of said hole.

5. In combination, a wooden supporting structure provided with a hole, a panel lapping said structure and consisting of a stiff foundation and a fabric covering for one side of the foundation, a spring fastener having a hook-like head engaged with said foundation from the uncovered side thereof, and a contractible shank projecting away from said head and having a normal width exceeding a cross dimension of said hole and including integral means formed to bite into or become embedded in the wall or walls of said hole when said shank is contracted by engagement with opposite walls of said hole.

6. The combination defined in claim 5 in which said shank is provided with surfaces forming a wedge-like tip which upon entering the shank into said hole causes a contraction of said shank.

BION C. PLACE.